United States Patent [19]

Cloeren et al.

[11] Patent Number: 5,020,984
[45] Date of Patent: Jun. 4, 1991

[54] APPARATUS FOR ADJUSTING DIE LIP GAP

[75] Inventors: Peter F. Cloeren; Richard L. Linam, both of Orange, Tex.

[73] Assignee: The Cloeren Company, Orange, Tex.

[21] Appl. No.: 521,101

[22] Filed: May 9, 1990

[51] Int. Cl.$^5$ .............................. B29C 47/22
[52] U.S. Cl. .................. 425/141; 264/40.1; 425/143; 425/466
[58] Field of Search ............ 425/466, 141, 143, 461, 425/144, 140; 264/40.1, 40.3, 40.5

[56] References Cited

U.S. PATENT DOCUMENTS

| | | | |
|---|---|---|---|
| 2,938,231 | 5/1960 | Lowey | 425/466 |
| 3,920,365 | 11/1975 | Mules | 425/141 |
| 3,940,221 | 2/1976 | Nissel | 425/466 |
| 4,507,073 | 3/1985 | Shelton | 425/466 |
| 4,726,752 | 2/1988 | VanDun | 425/141 |
| 4,753,587 | 6/1988 | Djordjevic et al. | 425/466 |
| 4,781,562 | 11/1988 | Sano et al. | 425/466 |
| 4,854,844 | 8/1989 | Carlsen | 425/141 |

FOREIGN PATENT DOCUMENTS 3731961  4/1989  Fed. Rep. of Germany ...... 425/466

Primary Examiner—Jay H. Woo
Assistant Examiner—William Matney
Attorney, Agent, or Firm—Timothy R. Kroboth

[57] ABSTRACT

The present invention provides an extrusion apparatus having an improved mechanism for thermally-controlled, lip gap adjustment. The apparatus includes a flow path for a gaseous cooling medium, in which flow path a plurality of temperature-responsive, lip gap adjustment members are disposed. Structurally associated with each such adjustment member is a heating wire.

4 Claims, 3 Drawing Sheets

APPARATUS FOR ADJUSTING DIE LIP GAP

BACKGROUND OF THE INVENTION

This invention relates to an extrusion apparatus having a lip gap adjustment mechanism for controlling sheet thickness.

As illustrated by U.S. Pat. Nos. 2,938,231, 3,940,221 and 4,753,587, an extrusion apparatus having a plurality of temperature-responsive, lip gap adjustment assemblies spaced apart across the width of the apparatus, is known. The lip gap is widened or narrowed as the gap-controlling, bolts or rods expand or contract thermally.

The '231 apparatus utilizes individually controllable, resistance heating wires coiled around and in direct contact with the gap-controlling, adjustment bolts. The '587 apparatus uses individually controllable, cartridge heaters, each of which is situated within a bore having a continuous helical channel for flow of a cooling medium. A cover for the lip adjustment assemblies thereof functions as a guide plate for the outflow of the cooling medium. An insulating member is used.

There is a need for an extrusion apparatus having an improved mechanism for controllably adjusting the lip gap. Advantageously, such an improved apparatus would provide for rapid thermally-controlled, lip gap adjustment.

SUMMARY OF THE INVENTION

It is accordingly an object of the present invention to provide an improved extrusion apparatus having a mechanism for controllably adjusting the lip gap.

It is a further object of the present invention to provide an improved apparatus that provides for rapid thermally-controlled, lip gap adjustment.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided an extrusion apparatus including lips forming an exit opening which extends along the width of the apparatus, and an exit opening control assembly. The control assembly includes spaced-apart members each having capacity to expand and contract thermally. Each such member is operatively arranged to adjust the exit opening at an individual location by expansion and contraction.

A heating wire is structurally associated with, and in direct contact with, each such member, and all such members are disposed within a common chamber having outlets for a gaseous medium for positively cooling such members. The common chamber is in fluid communication with a plenum, and forms in combination with the plenum a flow path for the gaseous medium. The plenum has an inlet for the gaseous medium. An insulating member is interposed between a main body of the apparatus, and the flow path and the members disposed within the common chamber of the flow path.

In the detailed description of the invention that follows, there is essentially described only a preferred embodiment of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

DETAILED DESCRIPTION OF THE INVENTION

The present invention is directed to a novel extrusion apparatus having a simplified mechanism for controllably adjusting the lip gap. Advantageously, this apparatus is able to provide for rapid thermally-controlled, lip gap adjustment.

Figure 1:
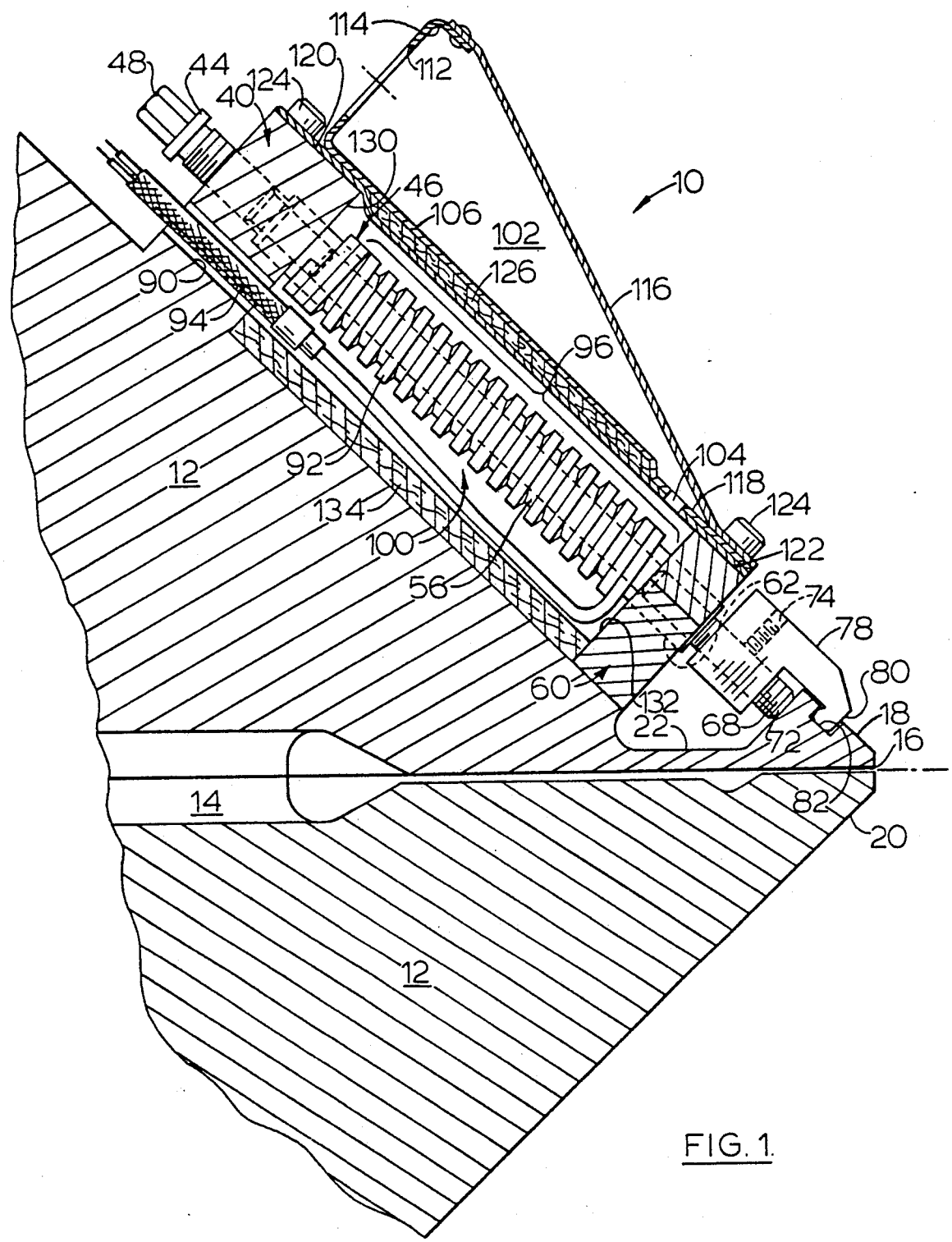
FIG. 1 is a partial cross-sectional view of a preferred embodiment of an extrusion apparatus in accordance with the present invention.

Referring to FIG. 1, a preferred embodiment of an extrusion apparatus 10 in accordance with the present invention, is shown. The apparatus includes a main body 12 having a flow passageway 14, which terminates in an exit slot 16 formed by lips 18,20. Lip 18 has a necked down portion defined by a recess 22, which allows flexibility of the lip for adjustably varying the thickness of the exit slot, thereby controlling the thickness of the extruded sheet. Exit slot 16 extends along the entire width, shown in FIG. 2, of the apparatus.

Figure 3:
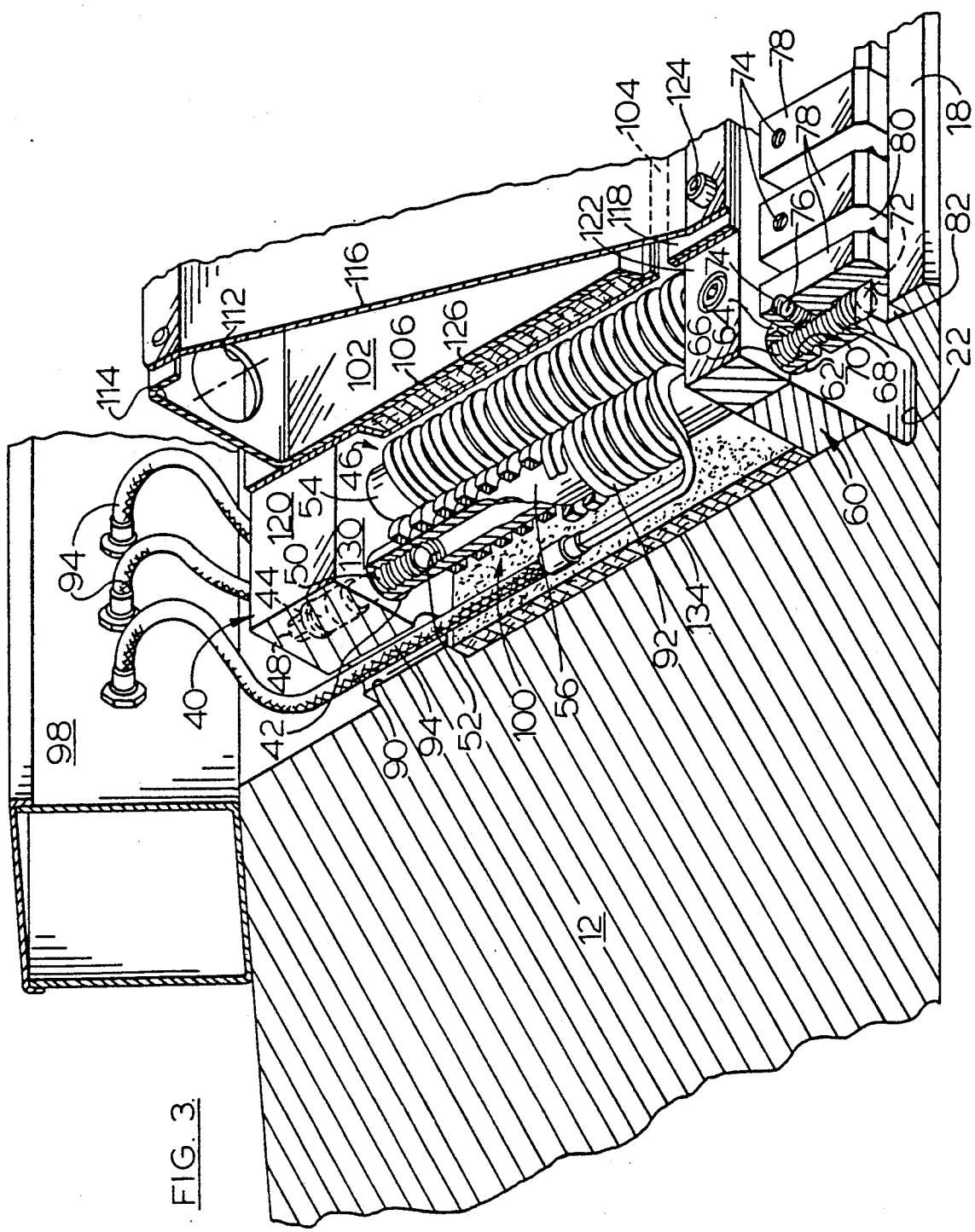
FIG. 3 is a cross-sectional view taken substantially along line 3—3 of FIG. 2, showing further details of the apparatus of FIG. 1.

Referring to FIG. 3, main body 12 has an extension 40 along its width which has a bore 42, through which an adjustment bolt 44 of a pushrod/adjustment assembly 46 is threaded and extends. A head 48 of the bolt is engageable by a wrench for manual adjustment of the lip gap.

Beneficially, bolt 44 has two different thread pitches to form what is commonly referred to as a differential thread adjustment bolt. Lower threads 50 of the bolt engage interior threads 52 of an upper end 54 of a pushrod 56 of adjustment assembly 46. The finer pitch of the lower bolt threads working in harmony with the coarser pitch of the upper bolt threads provides for fine manual adjustment of the exit slot 16.

Pushrod 56 is advantageously a hollow tube. This feature facilitates fast response of the pushrod to temperature change. To additionally provide for a fast rate of thermal response, the pushrod is advantageously made of stainless steel.

Main body 12 also has an extension 60 along its width which has a smooth throughbore 62, through which a lower end 64 of the pushrod extends. Threads 66 of a bolt 68 of adjustment assembly 46 engage interior threads 70 of the lower end of the pushrod. Bolt 68 has an operating end 72 in contact with lip 18.

Mounted on bolt 68 and having a bore 74 for a threaded fastener 76 for contact with the bolt, is a push-pull adjustment block 78 of pushrod/adjustment assembly 46. Adjustment block 78 has a projection 80 which engages a groove 82 of lip 18.

Extension 40 of main body 12 also includes a bore 90 which beneficially has a diameter sufficient to allow exit flow, when a resistance heating wire 92 is in place, of a gaseous medium used as a cooling medium. Power leads 94 for heating wire 92 extend through bore 90.

Coiled around, and advantageously in direct contact with, a portion 96 of pushrod 56 disposed between extensions 40,60 of the main body 12 is heating wire 92. Direct contact of wire 92 with pushrod 56 facilitates quick heat transfer between the wire and the pushrod. Direct contact is beneficial both in the heating of the pushrod and in drawing heat from the pushrod for cooling.

It will be appreciated that FIG. 1 shows only one pushrod/adjustment assembly, and that many such assemblies are arranged in a predetermined spaced-apart relationship across the width of an extrusion apparatus in accordance with the present invention. A plurality of such assemblies are indicated in the view of FIG. 2, in which the width of apparatus 10 is designated by a "W", and in which an electric box 98 from which lead wires 94 emanate, is shown.

Figure 2:
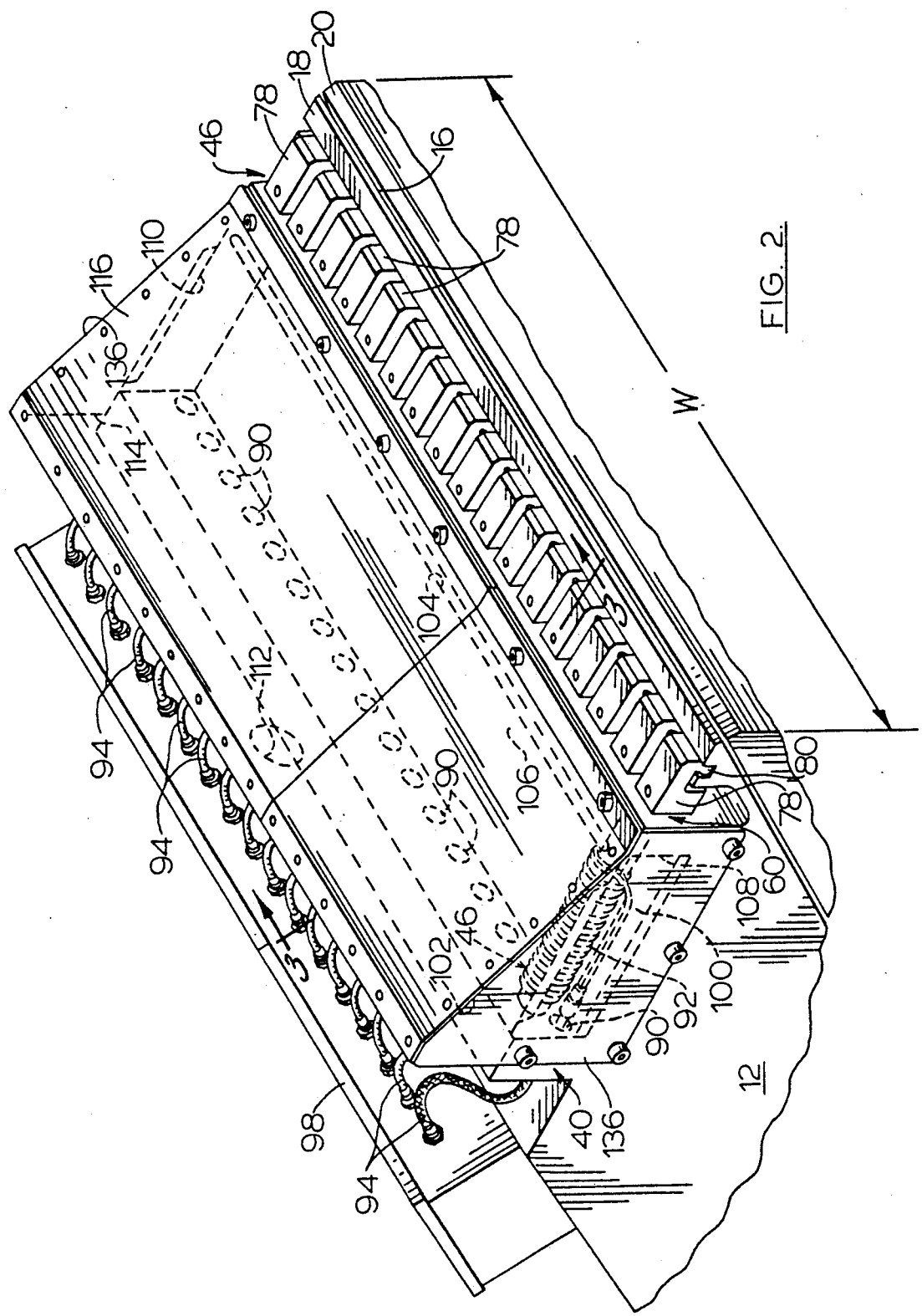
FIG. 2 is a partial perspective view of the extrusion apparatus of FIG. 1.

Referring to FIGS. 1 and 3, the pushrods and surrounding wires of the assemblies indicated in FIG. 2, are disposed within a common chamber 100, which is in fluid communication with a second chamber or plenum 102. The combination of chamber 100 and plenum 102 provides a flow path for the gaseous medium.

With reference to FIG. 2, beneficially providing for fluid communication between the chamber and plenum is an elongated slot 104, which may be intermittent to provide structural strength. Slot 104 is located in a wall member 106 which is common to chamber 100 and plenum 102. Suitably, the slot has a width which extends from the locus of a pushrod/adjustment assembly at an end 108 of chamber 100 to the locus of a pushrod/adjustment assembly at an opposite end 110 of the chamber. Wall member 106 has a width that is substantially the same as the width W of apparatus 10.

Referring particularly to FIG. 3, an inlet 112 provides for the inflow of the gaseous medium, which may be air, into plenum 102, and then into chamber 100 and contact with the pushrods and surrounding wires. Beneficially, the gaseous medium provides for positive cooling by directly contacting the pushrods and surrounding wires. Inlet 112 is in fluid communication with a source, not shown, of the cooling gas, which will conveniently be forced air.

Cooling gas forced into plenum 102, will be at a pressure greater than atmospheric pressure, with the pressure generally ranging from about 16 to 30 psia. A typical pressure will be about 16 to 20 psia, for which a blower may be used as a source of forced air. If a higher pressure is desired, compressed air may be used.

Conveniently, particularly in the case of air, the cooling gas may be at ambient temperature, but if desired, could be cooled by conventional means prior to passage into plenum 102. It will be appreciated that increased cooling within chamber 100 may be provided by either increasing gas flow or, for instance, by cooling the gas prior to passage into the plenum.

Fluid flow through plenum 102 and into chamber 100 is aerodynamically directed as now explained. Inlet 112 is located at an opposite end 114 of the plenum from elongated slot 104. Additionally, wall member 106 and a wall member 116, which cooperate to form the plenum, converge at an elongated slot end 118 of the plenum. As a result, the gaseous medium is directed into chamber 100.

As shown in FIG. 2, outflow of cooling gas is provided by a plurality of bores 90. A power lead 94, which connects to a heating wire 92, conveniently extends through each of these bores. Each such bore has a diameter sufficient to allow exit flow of the gaseous medium. Each pushrod 56 beneficially has a outflow bore 90 proximate thereto. FIG. 2 indicates an outflow bore for each pushrod.

Referring also to FIG. 1, plenum 102 is detachably fastened to the main body 12 of the apparatus in order to provide for easy access to chamber 100. Fastening of the plenum to walls 120 and 122 of main body extensions 40,60, respectively, may be provided by, for instance, threaded fasteners 124. If desired, access to chamber 100 could be provided by a hinged plenum.

With reference to FIGS. 1 and 3, wall member 106, which is conveniently common to both chamber 100 and plenum 102, advantageously includes insulating material 126. Insulation 126 reduces a warming effect of heat within chamber 100, on the gaseous medium flowing through the plenum. Generally, any such warming effect would be insignificant because residence time of the gaseous medium in the plenum will be very small, say approximately 1 to 2 seconds.

Wall surfaces 130,132 of main body extensions 40,60, respectively, cooperate with wall member 106 and beneficially with an insulating member 134 to form chamber 100. Insulating member 134 is therefore interposed between main body 12 of the apparatus and the gaseous medium flow path, in particular chamber 100 thereof, in which the pushrods and surrounding wires are disposed. End cover plates 136, shown in FIG. 2, seal the ends of chamber 100 and plenum 102.

As can be understood, an apparatus in accordance with the present invention, includes a plurality of pushrod/adjustment assemblies for controllably adjusting the lip gap, and these assemblies are spaced apart along the width of the apparatus. Furthermore, each pushrod is beneficially hollow, and surrounded by, and advantageously in direct contact with, an individually controllable, heating wire; a gaseous medium is aerodynamically directed into a common chamber containing the pushrods; and a gaseous medium outlet proximate to each pushrod is advantageously provided. In this way, the inventive apparatus provides for fine thermally-controlled adjustment of the lip gap along the entire width of the exit opening. Furthermore, the apparatus provides for fast response of the pushrods to temperature change, and consequently for reduced time to obtain a desired lip gap adjustment.

In operation, manual adjustment of the lip gap of apparatus 10 is provided by rotation of the head 48 of each differential thread adjustment bolt 44 in the desired direction. Thereafter, flow of the thermoplastic stream through lips 18,20 is commenced.

Once a steady state operation has been reached, the extruded sheet is measured along the width, and deviations from the desired thickness are used to determine the heat output of individual wires 92. A stream of ambient or cooled air is continuously passed through the flow path provided by plenum 102 and chamber 100. Pushrods 56, which are located in chamber 100, expand and contract longitudinally in response to the thermal environment. Thermally-controlled, lip gap adjustment is typically provided by changing only the heat output. However, the flow rate or temperature of the cooling gas may be additionally changed.

Having described the invention in detail and by reference to a preferred embodiment thereof, it will be apparent that modifications and variations are possible without departing from the scope of the invention defined in the appended claims. Several changes or modifications have been briefly mentioned for purposes of illustration.

We claim:

1. An extrusion apparatus comprising means forming an exit opening which extends along the width of the apparatus, and exit opening control means comprising a plurality of spaced-apart members each having capacity to expand and contract thermally, and each operatively arranged to adjust the exit opening at an individual location by expansion and contraction, individual heating means structurally associated with, and in direct contact with, each of said plurality of members, and the combination of said associated heating means and said plurality of members being disposed within a common plenum having a plurality of outlets for a gaseous cooling medium, said common plenum being in fluid communication with a chamber having means for inletting said gaseous medium and forming in combination with said chamber a flow path for cooling of said plurality of members by said gaseous medium, and insulating means interposed between a main body of said apparatus, and said flow path and said plurality of members disposed therein.

2. The apparatus of claim 1, wherein said plurality of members are hollow members.

3. The apparatus of claim 1, wherein said flow path is for cooling of said plurality of members by a stream of ambient air.

4. The apparatus of claim 1, wherein said common plenum and said chamber are formed in part by a common wall member.

* * * * *